Nov. 29, 1955 | A. C. SCHROEDER | 2,725,530

QUANTIZING APPARATUS

Filed Oct. 12, 1950 | 2 Sheets-Sheet 1

INVENTOR
Alfred C. Schroeder
BY
ATTORNEY

Nov. 29, 1955 A. C. SCHROEDER 2,725,530

QUANTIZING APPARATUS

Filed Oct. 12, 1950 2 Sheets-Sheet 2

INVENTOR
Alfred C. Schroeder
BY
ATTORNEY

United States Patent Office 2,725,530

Patented Nov. 29, 1955

2,725,530

QUANTIZING APPARATUS

Alfred C. Schroeder, Southampton, Pa., assignor to Radio Corporation of America, a corporation of Delaware Application October 12, 1950, Serial No. 189,762

The terminal fifteen years of the term of the patent to be granted has been disclaimed.

2 Claims. (Cl. 332—11)

This invention relates to quantizing apparatus.

It has previously been discovered that the signal to noise ratio of transmitted signals can be improved if only discrete values of the signal are transmitted. For example, assume that a sawtooth wave is to be transmitted. If only ten discrete signal levels can be established, the outline of the sawtooth can be approximated. At the receiver the received signal is again quantized into the same proportionate discrete levels. Therefore, any noise that has an amplitude less than the amplitude between any two discrete levels is eliminated. Various types of apparatus have been suggested for performing this quantizing operation. Generally speaking, the previously used apparatus has either included highly involved and complicated circuitry or specialized tubes.

Therefore, it is an object of this invention to provide quantizing apparatus that employes a relatively small number of standard components.

Briefly, this objective may be accomplished by employing a pair of unilateral current conducting devices connected back to back, or plate to plate or cathode to cathode in the case of diodes. The voltage at the junction of these two devices is maintained at a different level from the voltage on the remote side of a first one of the devices. When the signal level applied to the remote side of the second unilateral current device is below a certain level, it passes current through an impedance that is arranged to cut off the first unilateral device. However, as the signal further increases, the first unilateral device becomes conductive. The output circuit derives its voltage from an intermediate point in a voltage divider, a first portion of which is connected in series with an impedance. The series combination is in parallel with said first unilateral device. The voltage supplied by the other portion of the voltage divider changes when the first unilateral device conducts current because this conduction places the last mentioned impedance in parallel with the first portion of the voltage divider so as to change the ratio of the impedances in the two portions of the voltage divider.

The details of this invention will be more clearly understood from a consideration of the drawings in which.

Figures 1, 1A:
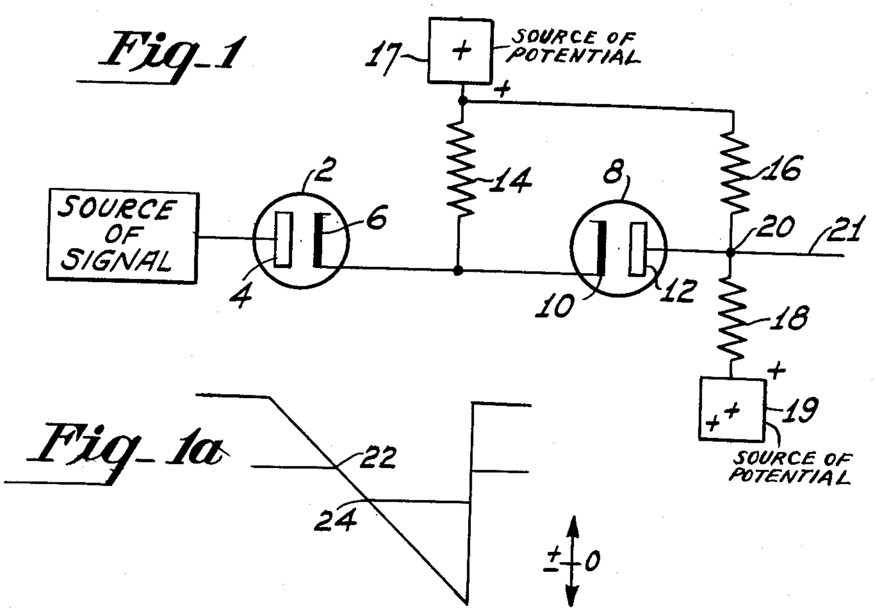
Figure 1 illustrates one particular arrangement of the unilateral conducting devices and their associated circuitry that performs in accordance with the principles of this invention.
Figure 1A is used for purposes of explanation of the operation of Figure 1.

Referring to Figure 1, there is shown a unilateral conducting device 2 which may be a diode having a plate 4 and a cathode 6 connected in series with another unilateral conducting device 8 which also may be a diode having a cathode 10 and a plate 12. The cathodes 6 and 10 of the diodes 2 and 8 are connected together so that the diodes may be said to be connected in series opposition or back to back. The junction between the two diodes or, in other words, the cathodes 6 and 10 are connected to a source of suitable positive potential 17 via an impedance which may be a resistor 14. A pair of series connected impedances which may be resistors 16 and 18 are connected in series between the first source of positive potential 17 and a second source of positive potential 19, the latter source 19 having a more positive voltage level. The plate 12 of the diode 8 is connected to the junction 20 of the resistors 16 and 18. An output circuit 21 is connected to the junction 20.

The operation of this quantizing circuit will now be expalined in connection with Figure 1A. Suppose a negative-going sawtooth wave of voltage such as illustrated in Figure 1A is applied to the plate 4 of the diode 2. Assume further that the upper portion or the base of the sawtooth has a potential level that is greater than potential level of the source of potential 17. As long as the sawtooth voltage wave has a potential that is greater in a positive direction than the potential of the source 17, the diode 2 conducts because the plate 4 is positive with respect to the cathode 6. However, the current drawn through the resistor 14 by the diode 2 makes the cathode 10 of the diode 8 positive with respect to the plate 12 and therefore the diode 8 does not conduct. As the positive potential of the sawtooth decreases, the current drawn through the common cathode resistor 14 decreases and the cathode 10 of the diode 8 falls to a lower and lower potential. When the cathode 10 becomes less positive than the plate 12, the diode 8 also begins to conduct.

Previous to the conduction of the diode 8, however, the potential at the junction 20 is determined by the difference in potential between the sources 17 and 19 and the ratio between the values of the resistors 16 and 18. When the diode 8 becomes conductive, the resistor 14 is effectively placed in parallel with the resistor 16. This effectively reduces the amount of resistance above the junction 20 with respect to the value of the resistor 18 and the voltage at the junction 20 decreases by one quanta level.

The point at which the diode 8 begins to conduct is indicated by the numeral 22 in Figure 1A. When the sawtooth voltage wave becomes more negative than the potential of the source 19 the diode 2 ceases to conduct. This point is indicated by the number 24 in Figure 1A. In between the points 22 and 24 of the curve shown in Figure 1A, therefore, both the diodes 2 and 8 are conducting. Accordingly, the signal applied to the plate 4 of the diode 2 also appears at the junction 20. In other words, between the points 22 and 24 of the curve shown in the Figure 1A, the voltage at the junction 20 follows the signal applied to the plate for the diode 2.

Figure 2:
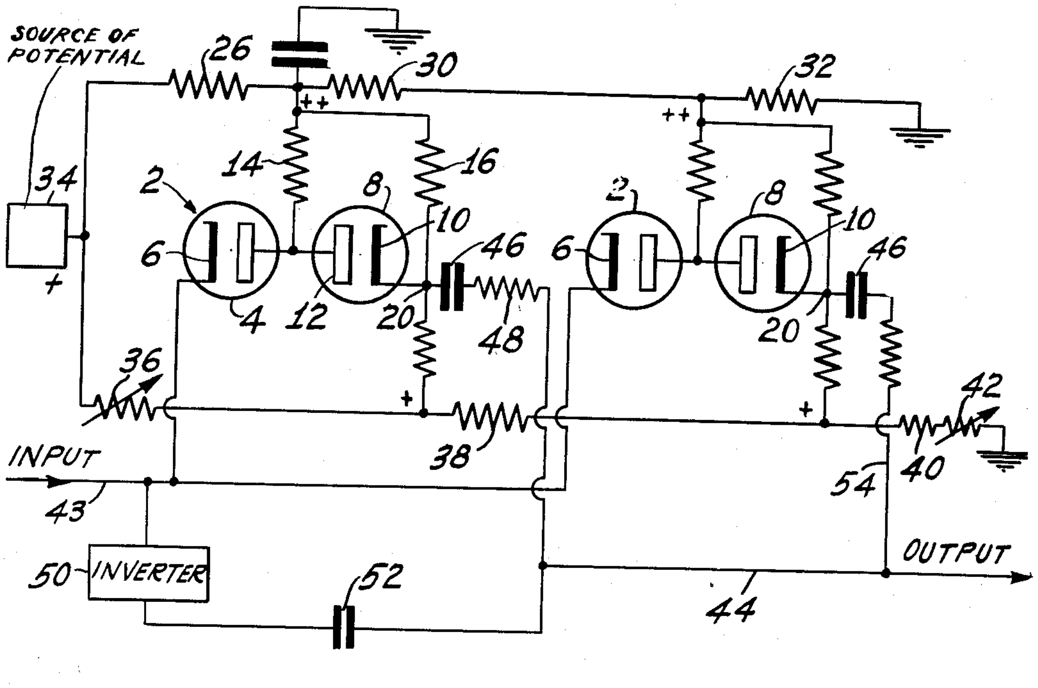
Figure 2 illustrates how several of these quantizing devices may be employed as well as showing a slightly different arrangement of the unilateral devices.

Figure 2 illustrates how a plurality of the quantized devices of this invention may be employed so as to quantize a signal into a number of separate steps. A voltage divider comprised of resistors 26, 30 and 32 are connected between a source of positive potential 34 and ground. The magnitude of this positive potential supplied by the source 34 must be at least as great as the amplitude of the largest signal to be quantized. A second voltage divider comprised of a variable resistor 36, a resistor 38 and a resistor 40 and another variable resistor 42 are connected in that order between the source 34 and ground. Between each of the corresponding junctions of the potentiometer sections a quantizing circuit similar to that illustrated in Figure 1 is connected. For purposes of simplicity, convenient corresponding parts will be indicated by the same numbers.

Figure 3:
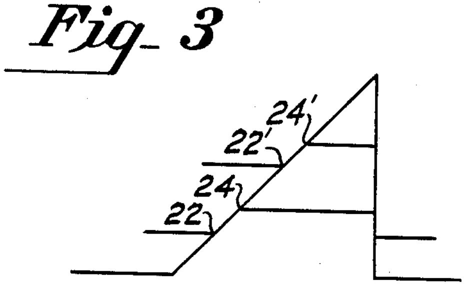
Figure 3 is a graph illustrating how a sawtooth wave of voltage is quantized by the apparatus of Figure 2.

However, it will be noted that in this case the plates 4 and 12 of the diodes 2 and 8 are connected together and to the resistor 14 whereas in the arrangement of Figure 1, the cathodes 6 and 10 were connected together. This makes no difference in the operation of the device except that in the explanation rendered above, a positive going sawtooth wave such as illustrated in Figure 3 would be employed. The cathodes 6 of all of the diodes 2 are tied to the source of the input signal. The cathodes 10 are each connected to an output lead 44 via a blocking condenser 46 and an isolating resistor 48. For convenience only a two-stage quantizer is shown. It is of course not intended that this invention should be limited to only two stages.

In order to prevent the input signal from being coupled to the output circuit 44 by the interelectrode capacitance of the diodes 2 and 8 in each of the quantizing units, an inverter 50 and a condenser 52 are connected in that order between the input lead and the output lead 34. This serves to neutralize any signal frequency that may be transmitted by the capacity coupling of the diodes.

A brief explanation of the operation of the apparatus in Figure 2 will now be given. Assume that the signal supplied to the input lead is a positive going sawtooth such as illustrated in Figure 3. Before the sawtooth wave reaches a voltage level that is greater than the voltage appearing at the junction of the resistors 30 and 32, both of the diodes 2 will be conducting and the diodes 8 will be non-conducting. However, when a voltage such as indicated by the point 22 on the curve of the Figure 3 is reached, the right hand diode 8 becomes conducting and the voltage appearing in the output lead 44 increases abruptly and then follows the increase in the sawtooth amplitude. When the point 24 in the curve of Figure 3 is reached, however, the potential of the input signal is greater than the potential at the junction of the resistors 30 and 32 and the right hand diode 2 becomes non-conducting. When the voltage wave increases to the next level, as indicated by the numeral 22', this operation is repeated in the left hand set of diodes. Inasmuch as the output voltages appearing at the junctions 20 are all added in the common output lead 44, the successive increases in voltage produces a quantized wave.

Figure 4:
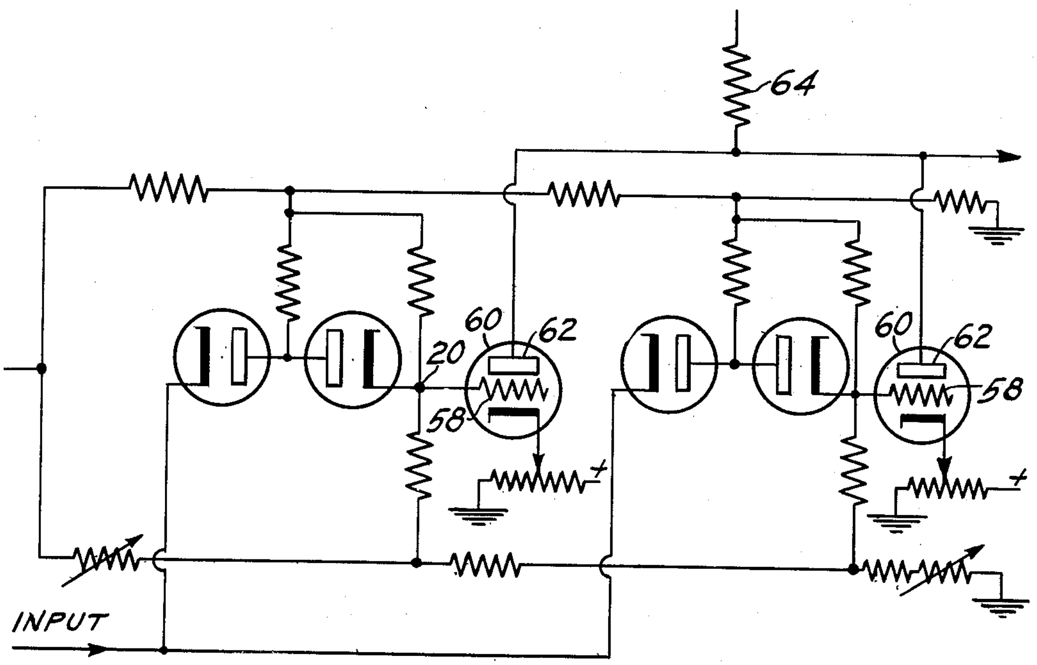
Figure 4 illustrates a different way of deriving the output signal from a plurality of quantizing devices constructed in accordance with the principles of this invention.

Figure 4 illustrates an arrangement of the quantized circuits of this invention that is similar to that of Figure 2 with the exception that the junctions 20 between the resistors 16 and 18 are each directly coupled to a control grid 58 of one of the amplifiers 60. The plates 62 of the amplifiers 60 are connected to a source of suitably positive potential via a common load impedance which may be a resistor 64. In this way, the increases in voltage appearing at the grids 58 and also at the junctions 20 are added in the load impedance 64. The cathodes of the amplifier 60 are connected to an adjustable source of positive potential in order that direct coupling can be achieved in accordance with methods well known to those skilled in the art. Although no neutralization circuit is shown in this arrangement, it will be understood that one similar to that shown in Figure 2 could be easily employed.

Having thus described my invention, what is claimed is:

1. Quantizing apparatus comprising in combination an input terminal adapted to receive the signal to be quantized, an output terminal at which the signal is to appear in quantized form, a first pair of diodes connected in series opposition between said input and said output terminals, a second pair of diodes connected in series opposition, said second pair of diodes being connected between said input and said output terminals, first and second resistors, one end of said first resistor being connected to the junction of said first pair of diodes, one end of said second resistor being connected to the junction of said second pair of diodes, means for establishing the other ends of said resistors at different fixed potentials, a third resistor having one end connected to the side of the diode in said first pair of diodes that is remote from the junction of said first pair of diodes and coupled to said output terminal, a fourth resistor that has one end connected to the side of said second pair of diodes that is remote from the junction of said second pair of diodes and coupled to said output terminal, means for establishing the other ends of said third and fourth resistors at different fixed potentials, the fixed potential applied to said third resistor differing from the fixed potential applied to said first resistor, and the fixed potential applied to said fourth resistor being different from the potential applied to said second resistor, and inverting means connected between said input terminal and said output terminal for providing a signal at said output terminal in phase opposition with the signal applied to said input terminal.

2. Quantizing apparatus comprising in combination an input terminal adapted to receive the signal to be quantized, an output terminal at which the signal is to appear in quantized form, a first pair of diodes connected in series opposition, a first isolating circuit, said first pair of diodes and said first isolating circuit being serially connected between said input and said output terminals, a second pair of diodes connected in series opposition, a second isolating circuit, said second pair of diodes and said second isolating circuit being serially connected between said input and said output terminals, first and second resistors, one end of said first resistor being connected to the junction of said first pair of diodes, one end of said second resistor being connected to the junction of said second pair of diodes, means for establishing the other ends of said resistors at different fixed potentials, a third resistor having one end connected to the side of the diode in said first pair of diodes that is remote from the junction of said first pair of diodes and coupled to said output terminal, a fourth resistor that has one end connected to the side of said second pair of diodes that is remote from the junction of said second pair of diodes and coupled to said output terminal, means for establishing the other ends of said third and fourth resistors at different fixed potentials, the fixed potential applied to said third resistor differing from the fixed potential applied to said first resistor, and the fixed potential applied to said fourth resistor being different from the potential applied to said second resistor, and inverting means connected between said input terminal and said output terminal for providing a signal at said output terminal in phase opposition with the signal applied to said input terminal.

References Cited in the file of this patent

UNITED STATES PATENTS

| | | |
|---|---|---|
| 2,324,275 | Becker | July 13, 1943 |
| 2,466,959 | Moore | Apr. 12, 1949 |
| 2,616,960 | Dell et al. | Nov. 4, 1952 |

FOREIGN PATENTS

| | | |
|---|---|---|
| 605,206 | Great Britain | July 19, 1948 |